(12) United States Patent
Preheim

(10) Patent No.: US 6,477,824 B2
(45) Date of Patent: Nov. 12, 2002

(54) ROUND BALER HAVING INCOMING CROP DEFLECTORS

(75) Inventor: William W. Preheim, Halstead, KS (US)

(73) Assignee: AGCO Corporation, Hesston, KS (US)

( * ) Notice: Subject to any disclaimer, the term of this patent is extended or adjusted under 35 U.S.C. 154(b) by 0 days.

(21) Appl. No.: 09/768,854

(22) Filed: Jan. 24, 2001

(65) Prior Publication Data

US 2002/0095925 A1 Jul. 25, 2002

(51) Int. Cl.[7] .................... A01D 39/00; A01D 43/02; A01D 75/00
(52) U.S. Cl. ............................... 56/341; 53/556
(58) Field of Search ................. 56/341, 342, 343, 56/DIG. 21; 100/88, 87; 53/556, 587

(56) References Cited

U.S. PATENT DOCUMENTS

| | | | |
|---|---|---|---|
| 4,581,879 A | * | 4/1986 | Anstey .................. 56/341 |
| 4,648,239 A | * | 3/1987 | Geiser et al. ............ 56/341 |
| 4,910,949 A | * | 3/1990 | Meyer .................... 56/341 |
| 5,080,009 A | | 1/1992 | Fritz et al. |
| 5,097,760 A | | 3/1992 | Ratzlaff et al. |
| 5,165,333 A | | 11/1992 | Ratzlaff et al. |
| 5,191,833 A | | 3/1993 | Clevenger, Jr. |
| 5,195,450 A | | 3/1993 | Marion |
| 5,224,329 A | | 7/1993 | Viaud |
| 5,228,280 A | | 7/1993 | Ratzlaff et al. |
| 5,479,767 A | | 1/1996 | McClure et al. |
| 5,603,206 A | | 2/1997 | Horchler, Jr. |
| 5,408,925 A | | 4/1998 | McClure et al. |
| 5,913,805 A | | 6/1999 | Vodon |
| 5,941,168 A | | 8/1999 | Kluver et al. |
| 6,006,504 A | * | 12/1999 | Myers et al. .......... 53/556 |
| 6,098,390 A | | 8/2000 | Anstey |
| 6,139,478 A | | 10/2000 | Viaud et al. |

OTHER PUBLICATIONS

AGCO/Hesston 545 Round Silage Baler Parts Catalog Mar. 1998—Form No. 700 716 040 Revision B (Cover and pp. 2–32, 2–33).

* cited by examiner

Primary Examiner—Robert E. Pezzuto
Assistant Examiner—Árpád Fábián Kovács
(74) Attorney, Agent, or Firm—Hovey Williams LLP

(57) ABSTRACT

A round baler has strategically located deflecting surfaces in the intake region of the machine to direct incoming crop materials away from sidewalls of the baler. In a preferred embodiment, the materials are directed away from clearance gaps between the outer edges of forming belts and the sidewalls of the baler. Each deflecting surface may be part of a deflector in the nature of a hollow wedge with an upright, angled-in deflecting surface, an upright rear wall, and a horizontal, triangular top wall. A fastening bolt may attach the deflector to the sidewall.

15 Claims, 3 Drawing Sheets

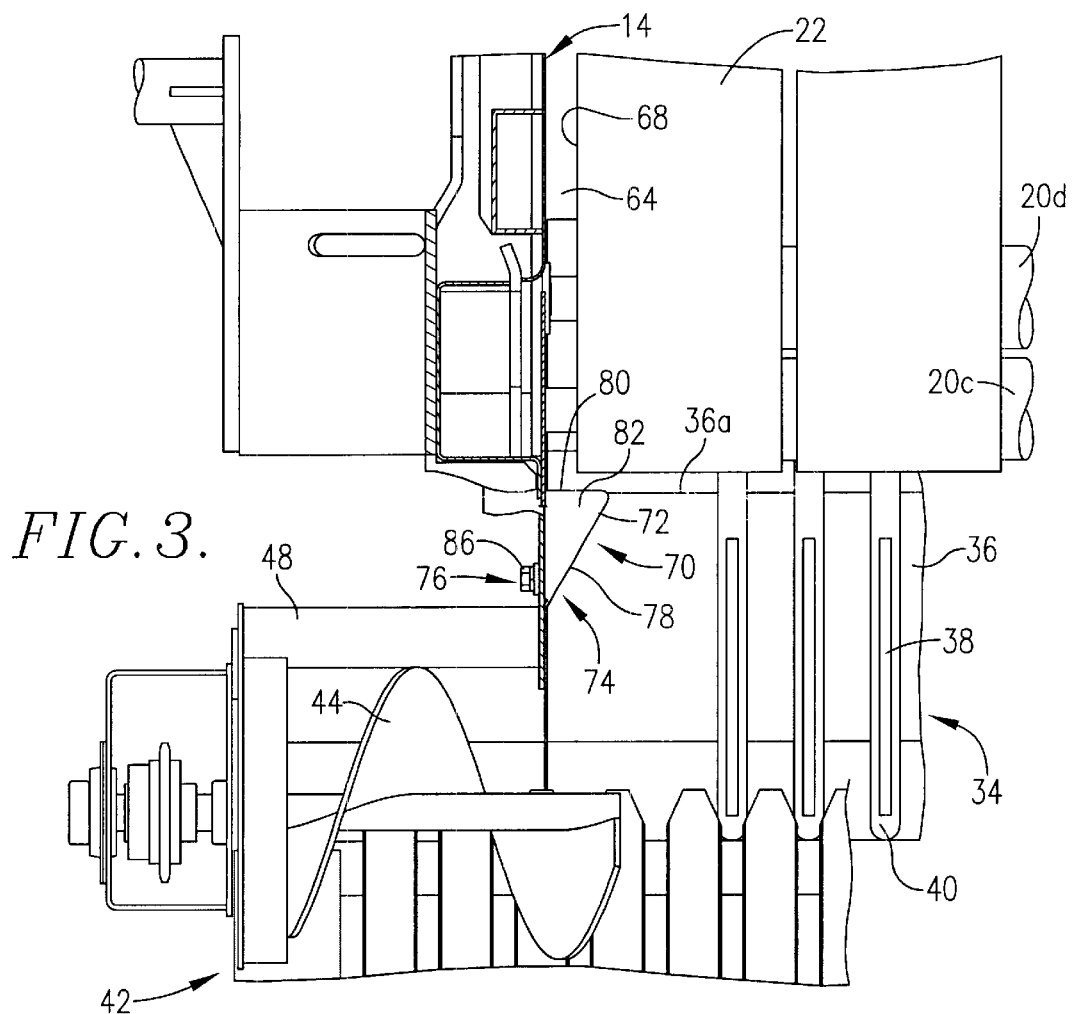

ROUND BALER HAVING INCOMING CROP DEFLECTORS

TECHNICAL FIELD

The present invention relates to the field of round balers and, more particularly, to a way of reducing the collection and accumulation of stray crop materials at undesirable locations within the baler such as, for example, on the rollers, shafts, bearings and other hardware of the baler, as well as within void areas behind forming belts of the machine.

BACKGROUND AND SUMMARY OF THE INVENTION

The accumulation of stray or "trash" crop materials at various locations within a round baler is a serious problem because it can lead to premature bearing failures and otherwise interfere with proper operation of the machine. The opposite ends of rollers near sidewalls of the baler are particular vulnerable, whether they are found in fixed or variable chamber machines, belt-type machines, machines with chains and slats, machines with rollers only, or machines with various combinations of these features. The problem is exacerbated in higher moisture conditions, such as during silage baling, because the wet, dense materials have a greater tendency to cling to the working components and adhere to one another at undesirable locations. Balers with windrow pickup headers that are wider than the baling chambers further compound the problem because the outboard margins of the wide stream of picked up materials are consolidated centrally before being fed rearwardly into the baling chamber, tending to cause heavy concentrations of materials near the sidewalls of the baler.

In machines employing belts or other web-like structures, a small clearance gap is created between the belt edges and the adjacent sidewalls. Crop materials entering the machine seem to become pinched in those gaps and then get carried by the belts to other areas of the baler, where they find their way behind the belts to accumulate in large masses or collect upon and wrap around various moving components. While numerous efforts have been made in the industry over a significant period of time to remedy these trash problems, none has been completely successful.

In accordance with the present invention, special deflectors are provided in the intake area of the baler to direct incoming materials away from the sidewalls toward the center of the machine. In a preferred embodiment, each deflector is generally wedge-shaped, having an upright angled deflecting surface that slopes inwardly and rearwardly generally toward the center line of the machine as the chamber is approached such that incoming crop materials are directed away from sidewalls, roller ends, chains, and outer belt edges. Each deflector preferably has an upright, rear, transversely extending wall interconnecting a rear extremity of the deflecting wall with the corresponding sidewall of the baler, and a generally triangular top wall that is connected to and overlies both the deflecting wall and the rear wall. The bottom of each deflector is left open and rests upon an upwardly and rearwardly inclined ramp surface in the intake region of the baler. Preferably, each deflector is hollow so as to present a cavity on its interior that generally faces the corresponding sidewall and within which a fastening bolt may be housed for attaching the deflector to the sidewall.

BRIEF DESCRIPTION OF THE DRAWINGS

FIG. 3 is a fragmentary, further enlarged horizontal cross-sectional view of the baler as in FIG. 2 but isolated but on only one of the deflectors;

FIG. 4 is a fragmentary front elevational view of the isolated structures shown in FIG. 3;

FIG. 5 is a perspective view of one of the deflector assemblies used in the baler, as viewed from the exterior of the deflector; and FIG. 6 is a perspective view of the deflector assembly taken from the opposite side thereof and illustrating the internal cavity of the deflector.

DETAILED DESCRIPTION

The baler 10 selected for illustration and description is a variable chamber, belt-type machine. It will be appreciated by those skilled in the art, however, that the principles of the present invention are not limited to this specific type of baler. They may also be employed with success in a variety of other types of balers including, without limitation, fixed chamber machines, those with rollers only and no belts, those with combinations of rollers and belts, and those with chains and slats. With this in mind, and for the sake of simplicity and good order, the following description will proceed with reference to a variable chamber, belt-type machine.

Figure 2:
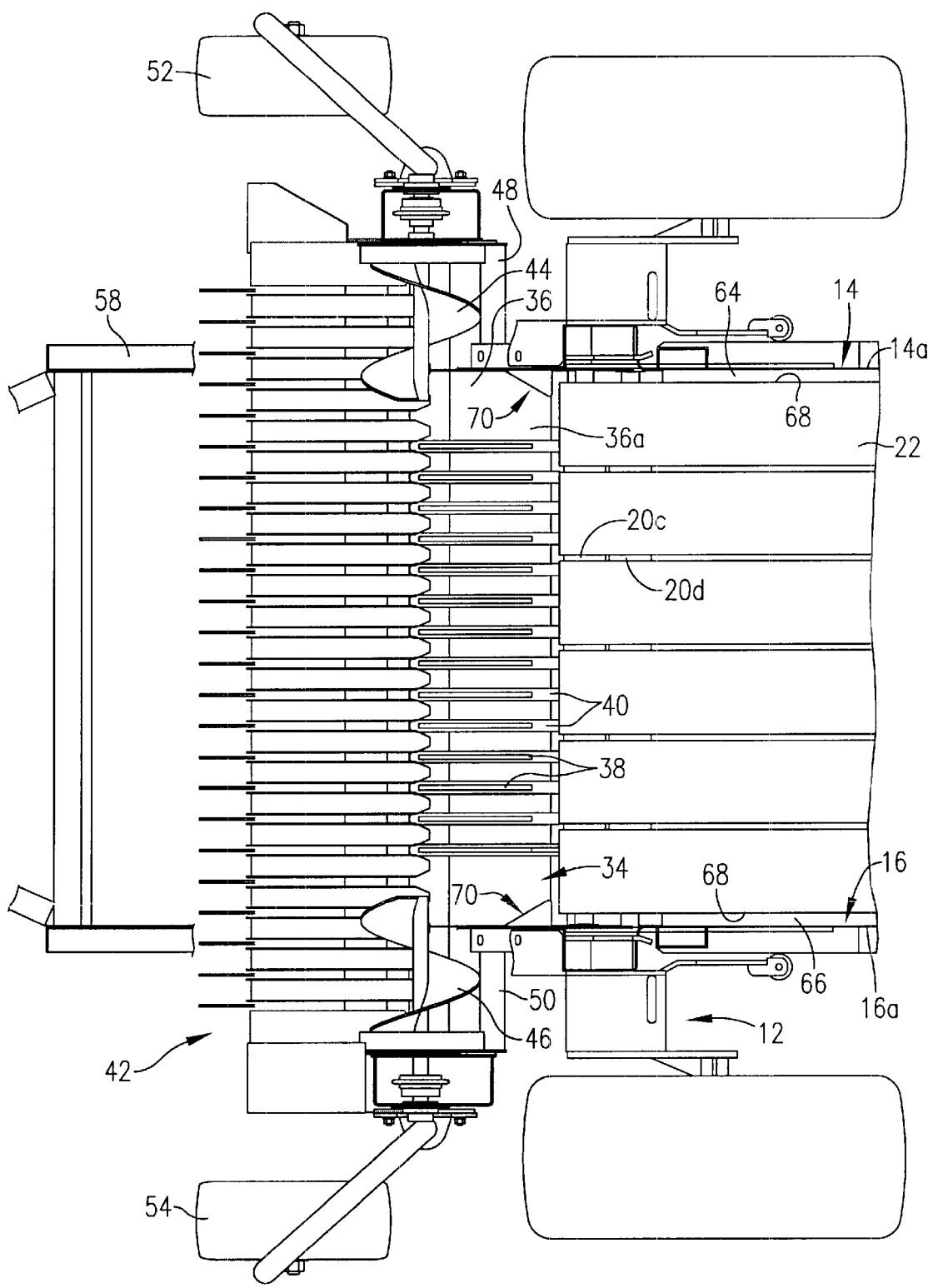
FIG. 2 is a fragmentary generally horizontal cross-sectional view through the baler looking down into the crop intake region to show the relationship between the crop deflectors and the gaps between the outboard belt edges and the sidewalls of the baler.

Baler 10 has a wheeled chassis 12 that supports a pair of upright, laterally spaced apart sidewalls 14 and 16. Bale forming mechanism broadly denoted by the numeral 18 is disposed between sidewalls 14,16 and includes, among other things, a plurality of transversely extending guide rolls 20 spanning sidewalls 14,16 and a series of endless, flexible, side-by-side belts 22 trained around rolls 20. As illustrated in FIG. 2, in one preferred embodiment there are six of the belts 22 disposed in side-by-side relationship across the width of the machine.

Figure 1:
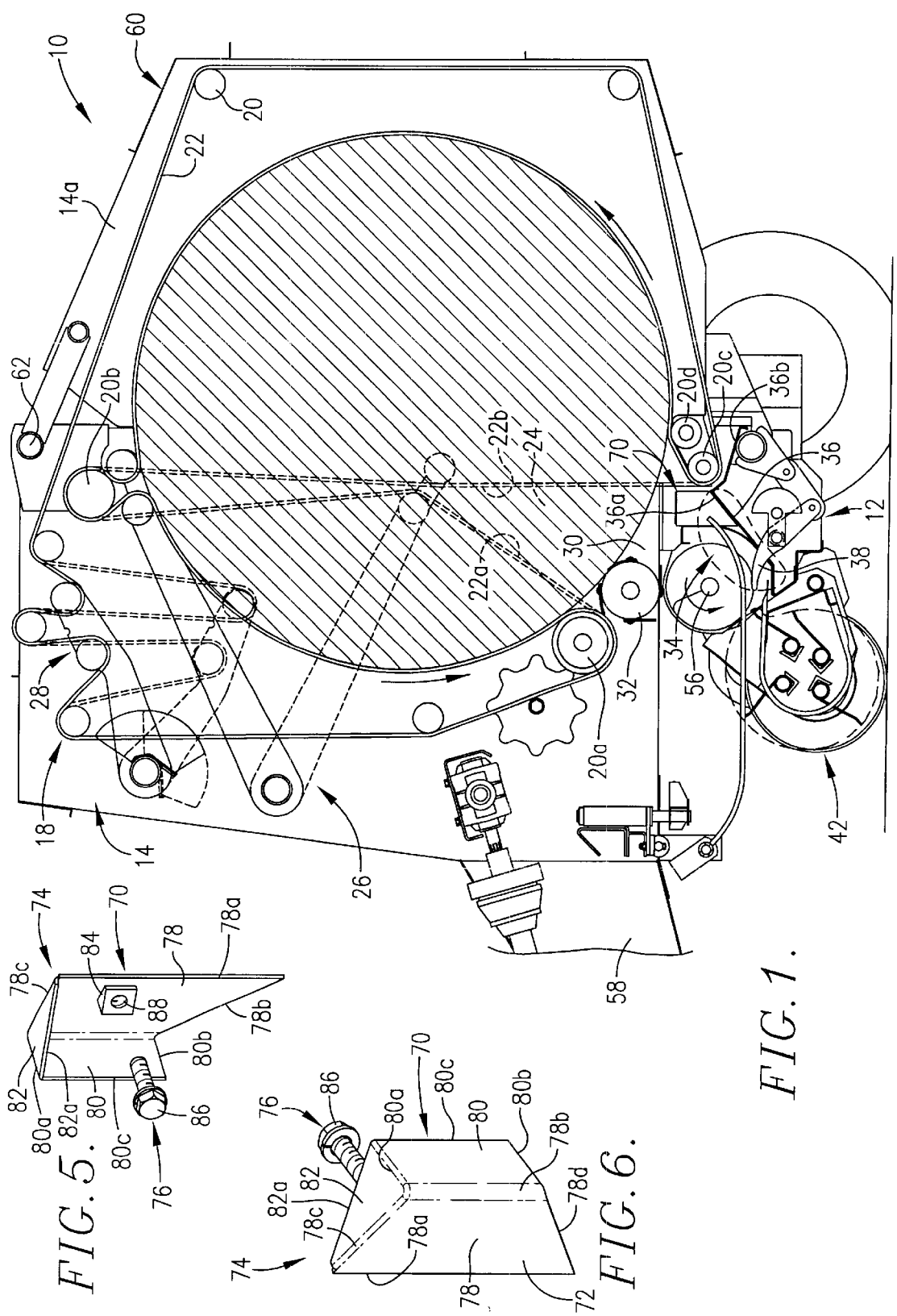
FIG. 1 is a fragmentary side elevational view of one exemplary embodiment of the invention, the particular baler chosen for illustration comprising a belt-type, variable chamber round baler with its near sidewall removed to show details of construction.

Belts 22 are trained under a drive roll 20a generally adjacent the lower front portion of the machine, up and over a drive roll 20b adjacent the top central portion of the machine, and down under a tailgate idler roll 20c in the lower portion of the machine spaced rearwardly and downwardly from the drive roll 20a. This arrangement causes the presentation of a baling chamber 24 between stretches 22a and 22b of the belts 22. Such chamber 24 is initially vertically oriented as illustrated in phantom lines in FIG. 1, but then assumes a larger, circular configuration as the bale grows in size and eventually reaches its full diameter as illustrated in solid lines in FIG. 1. A slack control assembly 26 of known design controls the amount of belt stretch available at any given moment to determine the size of bale chamber 24, and a tension control assembly 28 of conventional design regulates the amount of compressive force applied by the forming belts 22 against the bale as it is being made within the machine. As indicated in FIG. 1, the front belt stretch 22a moves generally downwardly, and the rear belt stretch 22b moves generally upwardly so as to rotate the growing bale in a generally counterclockwise direction viewing FIG. 1 as the formation process is carried out, all as well understood by those skilled in the art.

The bottom of baling chamber 24 is open so as to define an inlet 30 located generally between the drive roll 20a and tailgate roll 20c. A clockwise rotating starter roll 32 is situated within inlet 30 slightly downwardly and rearwardly from drive roll 20a for the purpose of helping to initiate tumbling of hay within chamber 24 during the start-up phases of a baling cycle, as well known. Upstream from inlet 30 and leading thereto is a crop intake region generally denoted by the numeral 34 and through which crop materials pass on their way to baling chamber 24. Such intake region 34 is defined along its bottom extremity by an upwardly and rearwardly inclined ramp 36 that is slotted as shown in FIG. 2 so that a series of feeding forks 38 can project up through slots 40 to assist in moving crop materials through region 34 and into chamber 24. Forks 38 move in a generally kidney-shaped path of travel as illustrated in FIG. 1 to carry out their feeding function. It will be noted from FIG. 2 that ramp 36 corresponds substantially in width to baling chamber 24 defined between sidewalls 14 and 16.

Crop materials are picked up from the ground and delivered to intake region 34 by a pickup header 42 located downwardly and forwardly from chamber inlet 30. In the illustrated embodiment, pickup 42 is wider than bale chamber 24 and ramp 36. Therefore, a pair of center-gathering stub augers 44 and 46 of known construction are utilized to converge the widest portions of crop material lifted from the ground by pick up 42 into a more consolidated condition corresponding to the width of bale chamber 24. In the illustrated embodiment, stub augers 44,46 are down-turning along their front margins as illustrated in FIG. 1 so that the converging outboard portions of the picked up crop pass underneath stub augers 44,46 rather than over-the-top thereof. Relatively short auger pans 48 and 50 are generally concentrically disposed about the respective stub augers 44,46 along the rear extremities thereof to confine the outboard crop materials as they are acted upon by stub augers 44,46. Pickup header 42 is supported by gauge wheels 52 and 54 for up and down swinging movement about a transverse axis coinciding with the common axis of rotation 56 of stub augers 44,46. A tongue 58 projects forwardly from chassis 12 above and in front of pick up 42 for hitching baler 10 to a towing vehicle (not shown).

As well understood by those skilled in the art, sidewalls 14,16 have rear portions 14a and 16a respectively that cooperate to present a tailgate generally denoted by the numeral 60 that may be raised to allow a finished bale to be ejected from chamber 24. Tailgate 60 in the illustrated embodiment is hinged about a transverse pivot axis 62 located at the top of the machine. Lower forward tailgate roll 20c is carried by tailgate 60 for movement therewith during such raising and lowering action. When tailgate 60 is in the closed position as illustrated in FIG. 1, lower, forward tailgate roll 20c is located immediately behind and in close proximity to the upper extremity 36a of ramp 36. As shown in FIG. 1, ramp 36 has a downwardly and rearwardly inclined rear slope 36b that essentially underlies lower forward tailgate roll 20c when tailgate 60 is in its closed position. It will also be noted that rear belt stretch 22b, while being essentially vertically disposed when bale chamber 24 is empty as shown in phantom lines in FIG. 1, assumes a laid back, upwardly and rearwardly inclined position as the bales grows, there being an additional idler tailgate roll 20d disposed upwardly and rearwardly from lower front tailgate roll 20c that engages belt stretch 22b when such stretch becomes laid back. The angle of incline of belt stretch 22b as it lies across the tops of tailgate rolls 20c and 20d substantially corresponds to the angle of incline of ramp 36 and forms a continuation thereof.

As illustrated particularly in FIGS. 2–4, the two outboard belts 22 are slightly spaced inwardly from the respective sidewalls 14 and 16 so as to define respective clearance gaps 64 and 66 at those locations. Each outboard belt 22 has an outer edge 68 that runs in close proximity to the corresponding sidewall 14 or 16 during operation, separated only by gap 64, it being noted that belts 22 have a tendency to wander somewhat along the length of the guide rolls 20 during operation such that the width of gap 64 is constantly changing to a certain extent.

In accordance with the present invention, baler 10 is provided with a pair of deflectors 70 adjacent opposite ends of lower forward tailgate 20c but in upstream relationship thereto within the intake region 34 for directing incoming crop materials generally away from gaps 64 and 66. As illustrated in FIG. 3, each deflector 70 is situated in fore-and-aft alignment with the corresponding gap 64 and 66 and, as illustrated in FIG. 4, is situated at the same level vertically as tailgate roll 20c so as to be in the same horizontal plane therewith. Each deflector 70 includes an angled deflecting surface 72 that is disposed in an upright attitude and slopes inwardly toward the center line of the baler away from the corresponding sidewall 14 or 16. As shown in FIG. 4, each deflecting surface 72 extends laterally inwardly far enough to completely overlap the gap 64 disposed therebehind.

FIGS. 5 and 6 illustrate details of construction of one preferred embodiment of the deflector 70, it being understood that the two deflectors 70 for each baler are mirror images of one another. Each deflector 70 comprises one part of a two-part deflector assembly 74, the other part comprising a fastener 76 for securing deflector 70 to the corresponding sidewall 14 or 16. Deflector 70 is a generally wedge-shaped, hollow, formed and welded metal part presenting a convex outer side and a concave inner side. Deflecting surface 72 is presented by the face of an upright, angled wall 78 having an upright leading extremity 78a, an upright trailing extremity 78b parallel to leading extremity 78a, a horizontal top extremity 78c extending at right angles to extremities 78a and 78b, and a lower extremity 78d extending upwardly and rearwardly at an angle relative to extremities 78a, 78b. Deflector 70 further includes an upright, rear wall 80 connected to rear extremity 78b and projecting laterally inwardly therefrom generally toward the corresponding sidewall of the baler. Rear wall 80 has parallel upper and lower extremities 80a and 80b respectively, as well as an innermost, upright extremity 80c parallel to rear extremity 78b of angled wall 78. Additionally, deflector 70 includes a top wall 82 of generally triangular configuration having a base that extends along upper extremities a upper 80a and an apex adjacent leading extremity 78a of angled wall 78. Top wall 82 is connected to and overlies angled wall 78 and rear wall 80 along extremities 78c and 80a. The hypotenuse of the triangle defined by top wall 82 extends along top extremity 78c, while the altitude of the triangle defined by top wall 82 is defined by a horizontally extending innermost edge 82a in the same vertical fore-and-aft plane as leading edge 78a of angled wall 78 and upright extremity 80c of rear wall 80. The bottom of deflector 74 is open inasmuch as it is devoid of a wall.

As illustrated in FIG. 6, walls 78, 80 and 82 cooperate to define a cavity on the interior side of deflector 70. A lug 84 is situated within such cavity, fixed to the interior surface of angled wall 78. Fastener 76 comprises a bolt 86 that is threadably received within a threaded hole 88 in lug 84 such that the shank of bolt 84 is housed within the interior cavity of deflector 70. As illustrated in FIG. 3, bolt 86 secures the deflector 70 up against the inside surface of sidewall 14 or 16. When deflector 70 is secured to sidewall 14 or 16, leading edge 78a of angled wall 78 butts up against the interior surface of the sidewall, as does upright extremity 80c of rear wall 80 and inboard extremity 82a of top wall 82. Bottom extremity 80b of rear wall 80 engages ramp 36 along the apex 36a thereof such that, in effect, rear wall 80 rises upwardly from apex 36a immediately in front of lower tailgate roll 20c in close proximity thereto. Lower diagonal extremity 78d of angled wall 78 abuts the top surface of ramp 36.

It will be understood by those skilled in the art that the deflectors 70 may be constructed from a variety of different materials and fabricated in many different ways without departing from the principles of the present invention. For example, instead of being metallic, each deflector 70 could be constructed from a synthetic resinous material. Similarly, instead of being formed and welded from plate material, deflectors 70 could be made by a casting process. In any event, the principles of the present invention would remain unchanged.

It should be apparent from the foregoing that the configuration and placement of the deflectors 70 is such as to cause incoming crop materials along the outboard edges of the stream to be progressively and gradually directed inwardly toward the center line of the baler as the materials flow past deflectors 70. Rather than attempting to abruptly block crop flow in the critical area immediately ahead of gap 64, which would be true if deflecting surface 72 were perpendicular to the direction of flow rather than oblique thereto as contemplated by the present invention, the deflecting surface 72 allows the outer edges of the stream to continue moving, but forces such areas to move toward the center at the same time. Further, because the deflectors 70 are situated in close proximity to lower forward tailgate roll 20c, there is little if any opportunity for the deflected materials to spread back out behind deflectors 70 before the materials are engaged by belts 22 and delivered to the bale. Consequently, the critical area of gaps 64,66 at tailgate roll 20c is largely kept free of errant crop materials, avoiding the serious shortcomings of the prior art.

The preferred forms of the invention described above are to be used as illustration only, and should not be utilized in a limiting sense in interpreting the scope of the present invention. Obvious modifications to the exemplary embodiments, as herein above set forth, could be readily made by those skilled in the art without departing from the spirit of the present invention.

The inventor(s) hereby states their intent to rely on the doctrine of equivalents to determine and assess the reasonably fair scope of the present invention as pertains to any apparatus not materially departing from but outside the literal scope of the invention as set forth in the following claims:

What is claimed is:

1. A crop deflector assembly for use in a crop intake region of a round baler, said deflector assembly comprising:
   a deflector having an upright, angled wall presenting an angled crop-deflecting surface, an upright, rear wall connected to a trailing extremity of said angled wall and extending laterally therefrom, and a horizontal top wall connected to and overlying said angled and rear walls; and
   a fastener operable to secure the deflector to the baler,
   said top wall being generally triangular when viewed in plan and presenting an inner edge that extends between a leading edge of said angled wall and an inner edge of said rear wall,
   said rear wall extending at generally right angles to said inner edge of the top wall.

2. A crop deflector assembly as claimed in claim 1,
   said angled wall having an upwardly and rearwardly inclined lower extremity.

3. A crop deflector assembly as claimed in claim 2,
   said rear wall having a horizontally extending lower extremity.

4. A crop deflector assembly as claimed in claim 1,
   said angled wall, said rear wall, and said top wall cooperating to define and internal cavity,
   said cavity being disposed to receive at least a portion of said fastener.

5. In a round baler, the improvement comprising:
   a pair of upright, laterally spaced apart sidewalls;
   bale forming mechanism including a plurality of transverse guide rolls spanning said sidewalls and a series of belts trained around said guide rolls in a manner to define a baling chamber between the sidewalls;
   a crop intake region in upstream relation to said baling chamber with respect to the direction of crop flow through the baler,
   said sidewalls including rear portions cooperating to present a tailgate that can be raised to discharge a finished bale from the chamber,
   said rolls including a lower, forward tailgate roll carried on the tailgate at the bottom of the chamber,
   said lower, forward tailgate roll being entrained by a stretch of said belts that defines the rear of the baling chamber,
   the belts of said stretch including a pair of outboardmost edges movable adjacent the sidewalls of the baler to present clearance gaps between the sidewalls and said outboardmost edges at opposite ends of said lower, forward tailgate roll; and
   a pair of angled deflecting surfaces upstream from, forwardly of, and adjacent said opposite ends of said lower, forward tailgate roll in disposition to direct incoming crop materials away from said gaps.

6. In a round baler as claimed in claim 5,
   said deflecting surfaces being disposed in fore-and-aft alignment with respective ones of said gaps,
   said deflecting surfaces being angled laterally inwardly away from said sidewalls as said lower, forward tailgate roll is approached.

7. In a round baler as claimed in claim 6,
   said deflecting surfaces being generally upright.

8. In a round baler as claimed in claim 7,
   each of said deflecting surfaces comprising part of a deflector having a generally upright rear wall extending transversely from a trailing extremity of said deflecting surface to the corresponding sidewall of the baler.

9. In a round baler as claimed in claim 8,
   each of said deflectors further having a generally horizontal top wall overlying said deflecting surface and the rear wall and extending transversely from the deflecting surface to the corresponding sidewall of the baler.

10. In a round baler as claimed in claim 9,
    said top wall being generally triangular, having a width that progressively increases as said lower, forward tailgate roll is approached.

11. In a round baler as claimed in claim 5,
    each of said deflecting surfaces comprising part of a hollow deflector having an upright, angled wall presenting said deflecting surface, an upright rear wall extending transversely from a trailing extremity of the angled wall to the corresponding sidewall of the baler, and a horizontal top wall connected to and overlying said angled wall and said rear wall, said angled wall, said rear wall, and said top wall cooperating to define an interior cavity of the deflector generally facing said corresponding sidewall of the baler.

12. In a round baler as claimed in claim 11, each of said deflectors comprising part of an assembly that also includes a fastener securing the deflector to the corresponding sidewall of the baler, said fastener having at least a portion thereof disposed within said cavity.

13. In a round baler as claimed in claim 11, each of said deflectors being devoid of a wall along the bottom thereof.

14. In a round baler as claimed in claim 13, said baler further including an upwardly and rearwardly inclined ramp defining a lower extremity of said crop intake region, said bottom of each deflector being located in close proximity to said ramp.

15. In a round baler as claimed in claim 5, said angled deflecting surfaces being located within said crop intake region.

* * * * *